US006313977B1

United States Patent
Hauer

(10) Patent No.: US 6,313,977 B1
(45) Date of Patent: Nov. 6, 2001

(54) CIRCUIT CONFIGURATION FOR REGULATING THE CURRENT FED TO AN ELECTROMECHANICAL COMPONENT IN A MOTOR VEHICLE

(75) Inventor: Gerald Hauer, Deuerling (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/550,211

(22) Filed: Apr. 17, 2000

Related U.S. Application Data

(63) Continuation of application No. PCT/DE98/03038, filed on Oct. 16, 1998.

(51) Int. Cl.⁷ .................................................. H03K 17/14
(52) U.S. Cl. ...................... 361/140; 123/568.31; 361/161
(58) Field of Search ..................... 361/23, 24, 25, 361/27, 139, 140, 160, 161, 165, 679, 709, 152, 154; 123/429, 568.12, 568.31; 72/99, 130

(56) References Cited

U.S. PATENT DOCUMENTS

| | | |
|---|---|---|
| 4,264,961 | 4/1981 | Nishimura et al. . |
| 4,266,257 * | 5/1981 | Rudich, Jr. .............................. 361/27 |
| 4,379,520 * | 4/1983 | Tomsu ................................. 236/49.3 |
| 4,612,895 | 9/1986 | Kuroiwa et al. . |
| 4,836,174 | 6/1989 | Chujo et al. . |
| 5,123,081 * | 6/1992 | Bachman et al. ..................... 388/815 |
| 5,146,907 | 9/1992 | Sawazaki et al. . |
| 5,159,532 | 10/1992 | Kilian et al. . |
| 5,585,995 * | 12/1996 | Baurand et al. ...................... 361/103 |

FOREIGN PATENT DOCUMENTS

| | | |
|---|---|---|
| 2630958 | 7/1978 | (DE) . |
| 3811670A1 | 10/1989 | (DE) . |
| 4223338A1 | 1/1994 | (DE) . |

OTHER PUBLICATIONS

"Thick–Film Thermistor and Its Application", Akira Ikegami et al., IEEE Transactions on Components, Hybrids and Manufacturing Technology, No. 4, Dec. 1980, pp. 542–547.
Japanese Patent Abstract No. 5135908 (Takeshi et al.), dated Jun. 1, 1993.

* cited by examiner

Primary Examiner—Kim Huynh
(74) Attorney, Agent, or Firm—Herbert L. Lerner; Laurence A. Greenberg; Werner H. Stemer

(57) ABSTRACT

A circuit configuration serves to regulate in particular a coil current for a hydraulic pressure regulating valve of a motor vehicle transmission. A current measuring resistor configured as a thick-film resistor and a temperature sensor, that detects a transmission oil temperature and is thermally coupled to the current measuring resistor, are applied on a circuit carrier produced from a ceramic material. The signals of the current measuring resistor and of the temperature sensor are fed to a control unit, in which the signal of the temperature sensor is used to compensate for a temperature-dependent resistance of the current measuring resistor.

4 Claims, 2 Drawing Sheets

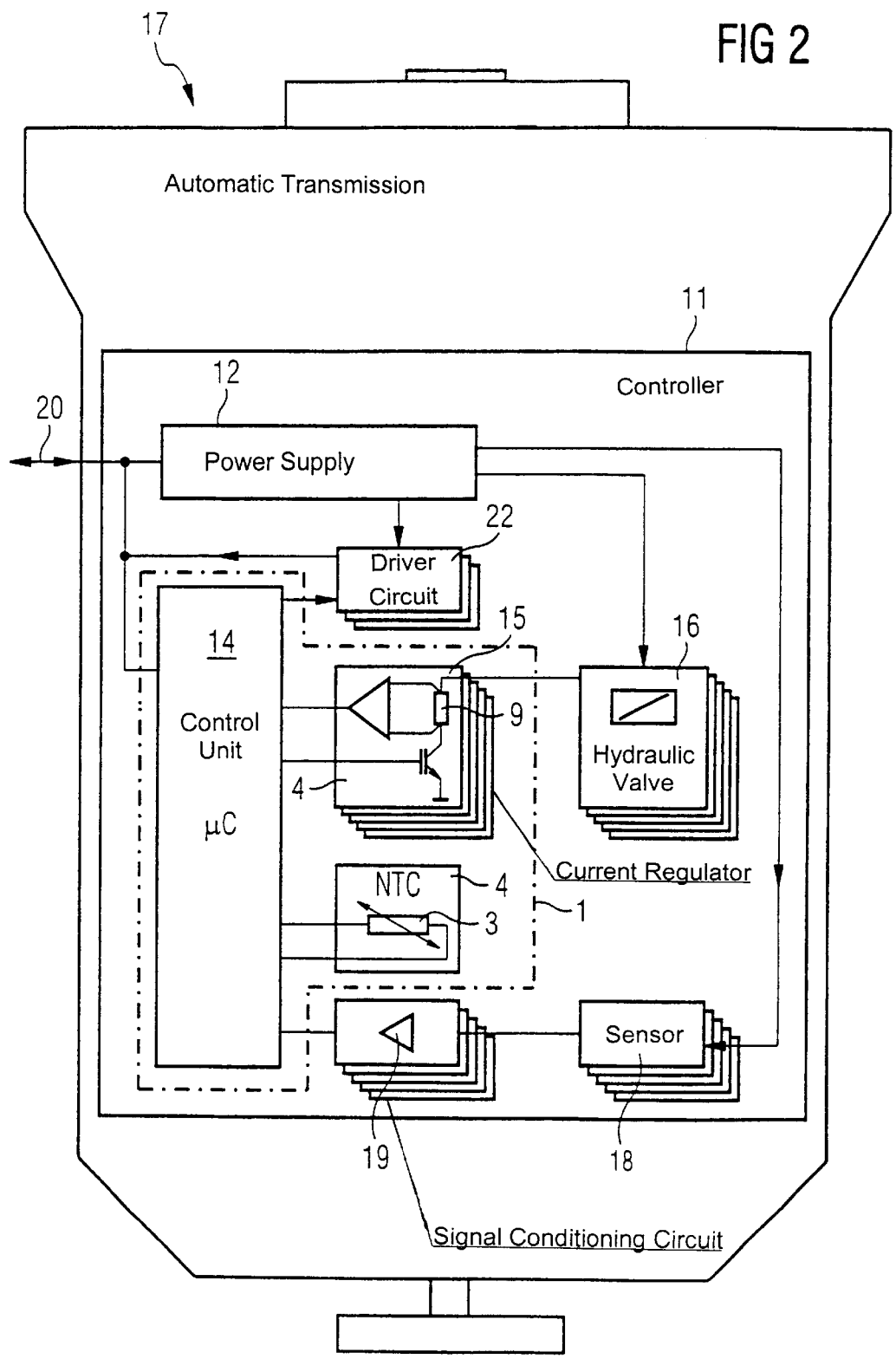

CIRCUIT CONFIGURATION FOR REGULATING THE CURRENT FED TO AN ELECTROMECHANICAL COMPONENT IN A MOTOR VEHICLE

CROSS-REFERENCE TO RELATED APPLICATION

This is a continuation of copending International Application PCT/DE98/03038, filed Oct. 16, 1998, which designated the United States.

BACKGROUND OF THE INVENTION

Field of the Invention

The invention relates to a circuit configuration for regulating a current fed to an electromechanical component of an automobile.

A circuit configuration of this type serves for regulating the current fed to the electromechanical component in the motor vehicle in particular a coil current for a hydraulic pressure regulating valve of an automatic motor vehicle transmission. It has a circuit carrier containing conductor tracks and components for controlling the electromechanical component, and also a current measuring resistor, whose signal is evaluated during the current regulation.

A device for detecting a load current is known from Published, Non-Prosecuted German Patent Application DE 42 23 338 A1, to be precise, a regulator with overload protection. A signal derived from a current measuring resistor and a reference signal are fed to an operational amplifier. The current measuring resistor is configured as a conductor track of a printed circuit. The reference signal is applied to a second input of the operational amplifier via a further conductor track. The two conductor tracks are constructed identically and are in good thermal contact. As a result, the load current is detected in a temperature-compensated fashion.

In the case of error compensation for measuring instruments, the measured values of the latter are calculated in a microcomputer as is known in German Patent DE 26 30 958 B2. The microcomputer is assigned memories in which are stored correction values, correction curves of reference quantities and of components, temperature coefficients, temperature profile curves and aging rates of the reference quantities and components. The correction values are measured using an analog-to-digital converter dedicated to the measuring instruments, and therefore contain this error as well. The measuring instruments register the time that has elapsed since a measuring instrument was used, and all of the stored correction values are taken into account in the calculation of the final measured values. The output signal of a temperature sensor and the stored temperature coefficients and curves are also taken into account in the calculation.

In the case of current regulators subjected to high temperature fluctuations, it is customary to bond a current measuring resistor made of constantan or a similar high-quality alloy on that side of the circuit carrier which bears the components, and to make contact with it by bonding wires. Although this enables accurate current measurement in a wide temperature range, such precision current measuring resistors are nonetheless expensive.

SUMMARY OF THE INVENTION

It is accordingly an object of the invention to provide a circuit configuration for regulating the current fed to an electromechanical component in a motor vehicle that overcomes the above-mentioned disadvantages of the prior art devices of this general type, which is a cost-effective and space-saving circuit configuration for current regulation.

With the foregoing and other objects in view there is provided, in accordance with the invention, a circuit configuration for regulating a current fed to an electromechanical component in a motor vehicle, including a coil current for a hydraulic pressure regulating valve of an automatic motor vehicle transmission. The circuit configuration includes a ceramic circuit carrier with conductor tracks disposed on the circuit carrier. Components are disposed on the circuit carrier for controlling the electromechanical component. A current measuring resistor is applied on the circuit carrier as a thick-film resistor. The current measuring resistor has a temperature-dependent resistance and outputs a first signal for evaluation during a current regulation process. Also included is a temperature sensor for detecting a transmission oil temperature. The sensor is thermally coupled to the current measuring resistor and is applied on the carrier circuit. The temperature sensor outputs a second signal. A control unit receives the first signal and the second signal and uses the second signal from the temperature sensor for compensating for the temperature-dependent resistance of the current measuring resistor.

In accordance with a further feature of the invention, there are provided further printed resistors. The components are applied on one side of the circuit carrier and the current measuring resistor and the further printed resistors are applied on an opposite side of the circuit carrier.

In accordance with an added feature of the invention, the temperature sensor is a negative temperature coefficient (NTC) thermistor.

In accordance with a concomitant feature of the invention, the current measuring resistor is a plurality of current measuring resistors, and the temperature sensor is a single temperature sensor provided to compensate for a temperature profile of the plurality of current measuring resistors.

The particular advantages of the invention are that a costly precision resistor is replaced by a current measuring resistor that is simple and cost-effective since it is printed onto the circuit carrier. Since the current regulator has not only the components for controlling the electromechanical components but also a series of resistors which are part of a printed circuit, the resulting manufacture is highly economical since the current measuring resistor can be concomitantly printed on at the same time. The outlay for mounting and making contact with the precision resistor is obviated, and the required material is inexpensive. Furthermore, mounting space on that surface of the circuit carrier that bears the discrete components becomes free.

On the other hand, the printed current measuring resistor supplies markedly temperature-dependent measured values, which must be compensated. This is achieved in a very simple manner by virtue of the fact that the signal of the temperature sensor is used for compensation purposes in a control unit, the temperature sensor being present in any case in the circuit configuration and being applied, in particular, on the circuit carrier itself.

Other features which are considered as characteristic for the invention are set forth in the appended claims.

Although the invention is illustrated and described herein as embodied in a circuit configuration for regulating the current fed to an electromechanical component in a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a block diagram of an automatic transmission provided with the circuit configuration in accordance with FIG. 1.

DESCRIPTION OF THE PREFERRED EMBODIMENTS

Figure 1:
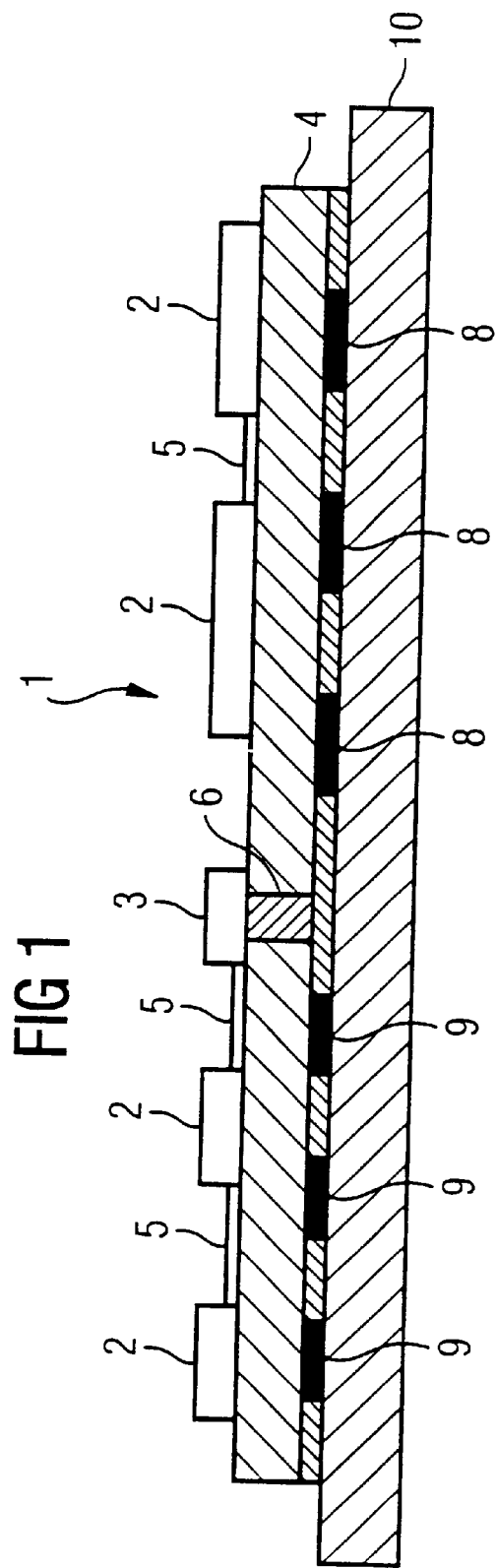
FIG. 1 is a diagrammatic, sectional view through a circuit configuration according to the invention.

In all the figures of the drawing, sub-features and integral parts that correspond to one another bear the same reference symbol in each case. Referring now to the figures of the drawing in detail and first, particularly, to FIG. 1 thereof, there is shown a circuit configuration 1 for regulating a current. The circuit configuration 1 is illustrated in a sectional view at right angles to its areal extent and has a ceramic circuit carrier 4, whose first side (upper side in the drawing) or surface is populated with discrete components 2, for example capacitors, transistors and integrated circuits (ICs) with which electrical contact is made via conductor tracks 5. Resistors 8 are printed on a lower, second side of the ceramic circuit carrier 4 using thick-film technology.

The entire ceramic circuit carrier 4 is bonded onto a metallic heat dissipating plate 10. A temperature sensor 3 is thermally coupled to the heat dissipating plate (or cooling plate) 10 via a plated-through hole 6. Consequently, the temperature sensor 3 measures a temperature of the heat dissipating plate 10, which is identical to the temperature of the resistors 8. The plated-through hole 6 is not absolutely necessary, since the heat dissipating plate 10 brings about a uniform temperature distribution over the whole circuit carrier 4. In that case, the temperature sensor 3 should not be located too near a component 2 that emits a great deal of heat.

An automatic motor vehicle transmission 17 (FIG. 2) contains an integrated transmission controller 11. A control current is fed to a hydraulic valve 16 by a current regulator 15. The current regulator 15 is located between a control unit 14 and the hydraulic valve 16. A plurality of current-regulated hydraulic valves 16 each with a current regulator 15 are usually provided in the transmission controller 11. The current fed to the hydraulic valve 16 is converted into a voltage by the current measuring resistor 9, which is connected as a shunt or shunt resistor, a voltage being fed to the control unit 14, where it is used for the purpose of current regulation. The current-controlled hydraulic valves 16 have a linear current-pressure characteristic curve and they serve for the continuously variable setting of oil pressures in the transmission 17, by which oil pressures the transmission is controlled, i.e. shifted, or the transmission ratio is set-continuously variably.

The temperature sensor 3 is preferably fitted on the circuit carrier 4 (see FIG. 1) of the current regulator 15 itself. To date, a precision measuring resistor has been bonded, and electrically contact-connected, as an additional component 2 on that surface of the ceramic circuit carrier 4 which bears the components 2, in which case the corresponding structural space has had to be provided.

According to the invention, the printed-on current measuring resistor 9 is used for the purpose of current measurement, which resistor is printed on together with the other resistors 8, in particular using thick-film technology on the underside of the circuit carrier 4. The illustration in FIG. 1 is based on the fact that the current measuring resistor 9 is bent twice, that is to say is configured in an S-shaped manner, and can thus can be seen three times in the sectional view. Thus, on the top side of the ceramic circuit carrier 4, a separately mounted component can be dispensed with and the overall size of the circuit carrier 4 can be reduced.

The comparatively high temperature-dictated measurement error of the printed current measuring resistor 9 is corrected with the aid of the temperature sensor 3 that is present in any case in the control unit 14. The current measuring resistor 9 and the temperature sensor 3 are thermally coupled via the circuit carrier 4, and if appropriate the plated-through hole 6, with the result that the temperature indication of the temperature sensor 3 can be used to correct the resistance of the current measuring resistor 9. If a plurality of the current measuring resistors 9 are provided for a plurality of hydraulic valves 16, then the temperature signal of a temperature sensor 3 can be used to correct all of the current measuring resistors 9. A power supply 12 supplies all the constituents of the transmission controller 11 and protects them against short circuits and incorrect voltages.

If the resistors 8 which are printed on the ceramic circuit carrier 4 are produced as thick-film resistors, then the temperature sensor 3 and the current measuring resistor 9 are also advantageously configured as thick-film resistors. Such temperature sensors are known, for example from IEEE Transactions and Components, Hybrids and Manufacturing Technology, Vol. CHMT-3, No. 4, December 1980, New York, USA "Thick-Film Thermistor and Its Applications" or Japanese Patent JP 5135908.

A temperature error of the printed current measuring resistor 9 of above 10% can be compensated for by the circuit configuration according to the invention to an extent such that the deviation of the currents to be measured is below 1%. The compensation is effected for example digitally in a microcontroller $\mu C$ of the control unit 14. The dependence of the resistance of the current measuring resistor 9 on the temperature is stored as a characteristic curve in the microcontroller, for example. Further constituents of the transmission controller which is integrated in the motor vehicle transmission are: signal conditioning circuits 19, in which the signals supplied by various sensors 18 are subjected to interference suppression and are conditioned before they arrive in the control unit 14 for evaluation. The sensors 18 provide information about different pressures, rotational speeds and positions and, consequently, about the operating state of the transmission 17.

The control unit 14 evaluates both external commands that arrive via a communications interface 20, and the sensor signals, and generates control signals in response. It controls, in particular, the communication, switches relays, regulates the hydraulic valves 16, records operating data and monitors the transmission 17 and the transmission controller 11.

Driver circuits 22 control, via relays, external loads such as, for example, an interlock which prevents a driving position of the transmission from being engaged by a selector lever when the brake is not actuated.

To summarize, the invention shall be explained as follows. The circuit configuration 1 serves to regulate in particular the coil current for the hydraulic pressure regulating valve 16 of the motor vehicle transmission 17. The current measuring resistor 9 configured as a thick-film resistor and the temperature sensor 3, which detects the transmission oil temperature and is thermally coupled to the current measuring resistor 9, are applied on the circuit carrier 4 produced from a ceramic material. The signals of the current measuring resistor 9 and of the temperature sensor 3 are fed to the control unit 14, in which the signal of the temperature sensor 3 is used to compensate for the temperature-dependent resistance of the current measuring resistor 9.

I claim:

1. A circuit configuration for regulating a current fed to an electromechanical component in a motor vehicle, including a coil current for a hydraulic pressure regulating valve of an automatic motor vehicle transmission, the circuit configuration comprising:

a circuit carrier formed of a ceramic material;

conductor tracks disposed on said circuit carrier;

components disposed on said circuit carrier for controlling the electromechanical component;

a current measuring resistor applied on said circuit carrier as a thick-film resistor having a temperature-dependent resistance, said current measuring resistor outputting a first signal for evaluation during a current regulation process;

a temperature sensor for detecting a transmission oil temperature and thermally coupled to said current measuring resistor and applied on said carrier circuit, said temperature sensor outputting a second signal; and a control unit receiving the first signal and the second signal, said control unit using said second signal from said temperature sensor for compensating for the temperature-dependent resistance of said current measuring resistor.

2. The circuit configuration according to claim 1, including further printed resistors, said components are applied on one side of said circuit carrier and said current measuring resistor and said further printed resistors are applied on an opposite side of said circuit carrier.

3. The circuit configuration according to claim 1, wherein said temperature sensor is a negative temperature coefficient thermistor.

4. The circuit configuration according to claim 1, wherein said current measuring resistor is a plurality of current measuring resistors, and said temperature sensor is a single temperature sensor provided to compensate for a temperature profile of said plurality of current measuring resistors.

* * * * *